United States Patent [19]

Nadler

[11] 4,400,805

[45] Aug. 23, 1983

[54] ACOUSTICALLY FILTERED TRANSDUCER

[75] Inventor: Harry Nadler, Thousand Oaks, Calif.

[73] Assignee: Rockwell International Corporation, El Segundo, Calif.

[21] Appl. No.: 257,840

[22] Filed: Apr. 27, 1981

[51] Int. Cl.³ .......................... H04R 1/28; H04R 17/10
[52] U.S. Cl. ..................................... 367/140; 181/140; 367/149; 367/162; 367/176; 73/648
[58] Field of Search ................. 367/13, 140, 149, 162, 367/163, 167, 172, 174, 176, 189; 310/322; 181/113, 160, 182, 122, 139, 140; 73/579, 648, 649

[56] References Cited

U.S. PATENT DOCUMENTS

| | | | |
|---|---|---|---|
| 2,978,672 | 4/1961 | Barney | 367/172 X |
| 3,219,970 | 11/1965 | Sims | 367/176 X |
| 3,262,093 | 7/1966 | Junger et al. | |
| 3,292,142 | 12/1966 | Carson | |
| 3,466,924 | 9/1969 | Roshon et al. | |
| 3,753,218 | 8/1973 | Hill et al. | |
| 3,781,779 | 12/1973 | Tallman | |
| 3,812,456 | 12/1973 | Lane et al. | |
| 4,006,707 | 2/1977 | Denslow | 310/322 |

Primary Examiner—Richard A. Farley
Attorney, Agent, or Firm—H. Fredrick Hamann; Craig O. Malin; John J. Deinken

[57] ABSTRACT

Disclosed is an acoustic transducer which includes a pressure tight vessel with a window in the vessel which is transparent to acoustic wave energy. A gas is disposed within the vessel, while an electromechanical transducer is located within the vessel at an antinode for a resonant wave of the gas. A port communicates with the interior of the vessel, with a pressure control coupled to the port and to a source of the gas for controlling the pressure of the fluid within the vessel.

6 Claims, 3 Drawing Figures

Fig.1,

ACOUSTICALLY FILTERED TRANSDUCER

BACKGROUND OF THE INVENTION

This invention relates to techniques for generating and detecting acoustic wave energy.

Acoustic waves are utilized in a variety of different fields of technology. Underwater communications systems, for example, transmit information on acoustic frequencies. In the nondestructive testing field, acoustic wave energy is extensively employed to interrogate materials and structures for hidden defects. Acoustic techniques are widely utilized in semismic exploration to detect subsurface deposits of valuable minerals such as oil and gas. Such specific applications of acoustic waves normally require the selective detection or generation of a particular frequency or band of frequencies within the broad spectrum of acoustic frequencies. The necessary frequency discrimination may be supplied to some extent by transducers which are selectively responsive to a certain bandwidth or by electronic filters which are designed to receive a broadband signal from a transducer and pass only the desired portion of that signal in the frequency range of interest.

In many applications, however, the available devices and techniques have provided less than the optimum frequency selection. Consequently, a need has developed in the art for an apparatus and method which will provide improved frequency selection within the acoustic signal spectrum.

SUMMARY OF THE INVENTION

It is a general objective of this invention to provide a new and improved acoustic transducer.

An acoustic transducer, according to the present invention, includes a pressure tight vessel, with an electromechanical transducer disposed within the vessel. A compressible fluid is also disposed within the vessel, which includes a port communicating with the interior of the vessel for changing the pressure of the fluid within the vessel.

In a more particular embodiment the vessel also includes a window which is transparent to acoustic wave energy, while the electromechanical transducer may be mounted within the vessel at an antinode of the resonant pattern of the fluid within the vessel.

In another embodiment, the acoustic transducer includes the pressure tight vessel, with a window in the vessel which is transparent to acoustic wave energy, a gas disposed within the vessel, an electromechanical transducer disposed within the vessel at an antinode for a resonant wave of the gas within the vessel, and a port communicating with the interior of the vessel. A pressure control is coupled to the port and to a source of the gas for controlling the pressure of the fluid within the vessel.

A method of converting acoustic wave energy to an electrical signal, according to the present invention, includes the steps of placing an electromechanical transducer within a pressure tight vessel at an antinode of a resonant wave and pressurizing the vessel to achieve a resonance at a predetermined acoustic wave frequency.

These examples summarize some of the more important features of this invention. There are, of course, additional details of the invention, which are further described below and which are included within the subject matter of the appended claims.

BRIEF DESCRIPTION OF THE DRAWINGS

Additional objectives, features, and advantages of the present invention will be evident from the description below of the preferred embodiments and the accompanying drawings, wherein the same numerals are used to refer to like elements throughout all the figures. In the drawings.

DETAILED DESCRIPTION OF THE PREFERRED EMBODIMENT

Figure 1:
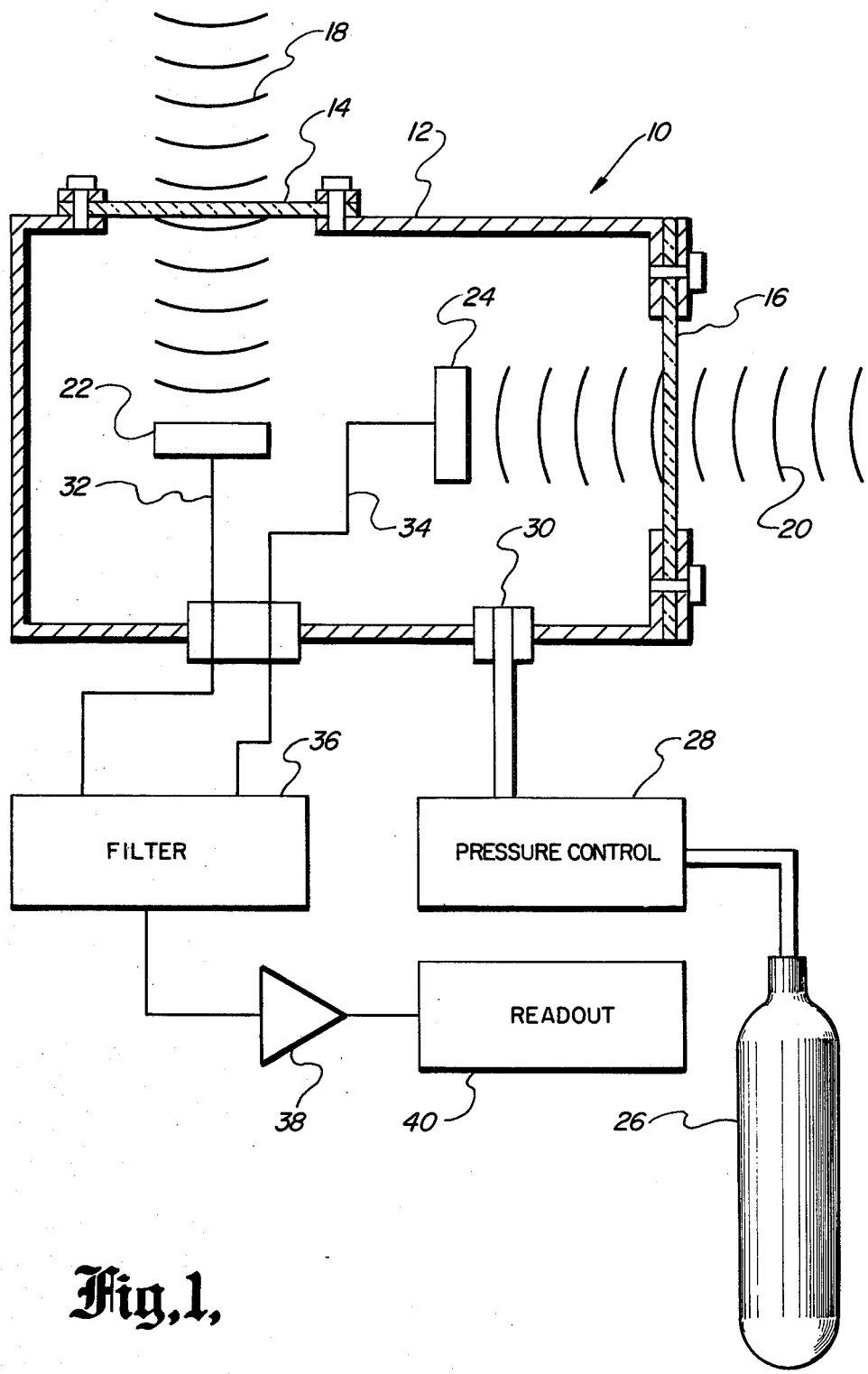
FIG. 1 is an illustration, partially in cross section and partially schematic, showing one embodiment of a transducer constructed according to the present invention.

FIG. 1 provides an illustration, partially in cross section and partially schematic, depicting one embodiment of a transducer constructed according to the present invention. The acoustic transducer 10 is housed in a pressure tight vessel 12. Windows 14 and 16, which are acoustically transparent, are provided to admit acoustic wave energy, as indicated by the wavefront lines 18 and 20, into the interior of the vessel. The pressure tight vessel can also be made without the acoustic windows, whereby the entire vessel serves to transmit the acoustic energy.

Situated within the vessel 12 are electromechanical transducers 22 and 24 which may be, for example, piezoelectric transducers of a design known in the art. In the embodiment illustrated the transducers are oriented to respond to acoustic wave energy arriving from two different directions.

The interior of the vessel 12 is filled with a compressible fluid, such as a gas, which is supplied by a source 26. A pressure control 28 is coupled to the source and to the vessel 12 by a port 30, in order to control the pressure of the gas within the vessel. Each of the transducers 22 and 24 is located within the vessel at an antinode of the resonance pattern which is characteristic of the gas within the vessel.

The transducers 22 and 24 respond to acoustic wave energy by producing electrical signal outputs, which are routed by lines 32 and 34 to a filter 36, then boosted by an amplifier 38 and converted to the desired output format in a readout device 40 such as, for example, an oscilloscope.

Figure 2:
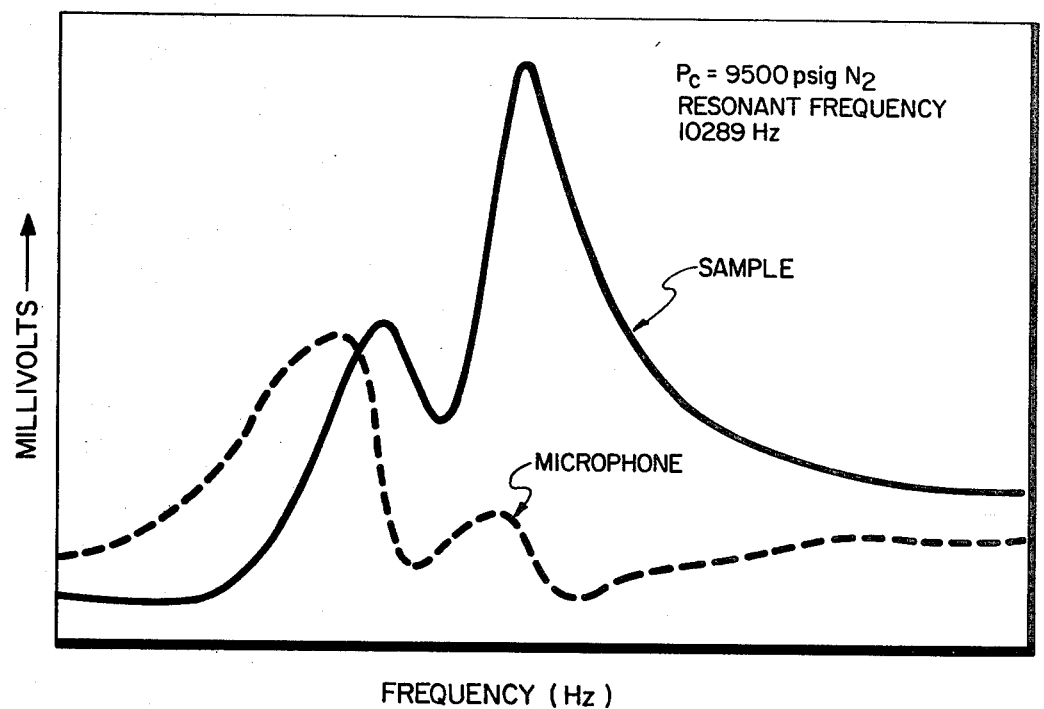
FIG. 2 is a graph of the frequency response which was obtained for a particular rock sample under a confining pressure of nitrogen gas, together with the frequency response of the confining gas.
Figure 3:
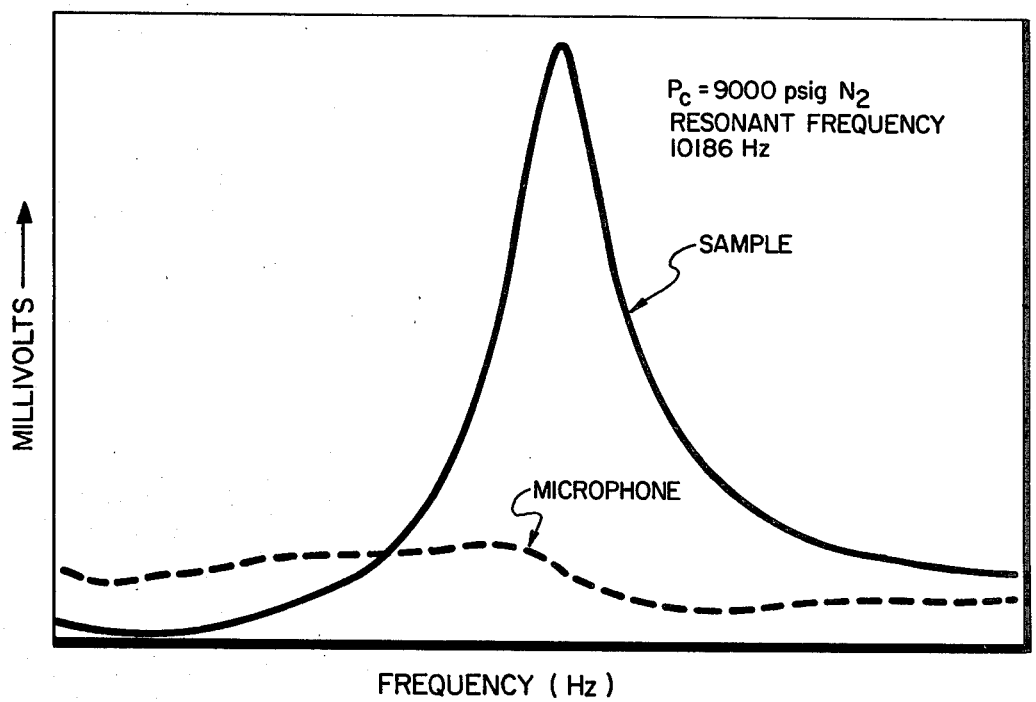
FIG. 3 is a graph of sample and gas frequency responses which were obtained from the same rock sample of FIG. 2 but with the confining gas at a slightly lower pressure.

The development of this invention was stimulated by an investigation of the behavior of seismic absorption mechanisms in sedimentary rocks. A brief explanation of this study will help to show how the advantages of the invention may be realized. The investigation involved making attenuation and velocity measurements on a number of different rock samples over a wide range of frequencies and at confining pressures ranging up to 10,000 p.s.i. The measurements were obtained by placing rock samples within a pressurized vessel and vibrating the rock samples at different frequencies, then recording the amplitude of the vibrations. These measurements produced the surprising result that a resonant vibration of the fluid in the pressure vessel could significantly affect the shape of the resonance curve for the vibrating rock sample which was contained within the vessel. FIG. 2, for example, is a graph of the frequency response which was obtained for a particular rock sample under a confining pressure of nitrogen gas at 9,500 p.s.i.g. The resonant frequency peak occurred at 10.289 kHz. The dotted line illustrates the frequency response of the confining gas, which was obtained by means of a microphone placed within the pressure vessel. FIG. 3 is a graph of the frequency response which was obtained for the same rock sample and the same gas, but at a slightly lower confining pressure of 9,000 p.s.i.g. The resonant peak for the rock sample was obtained in the latter case at 10.186 kHz. A comparison of the two figures illustrates the considerable effect which a resonance of the pressurized fluid can have on the response of the vibrating rock sample, as is demonstrated by the artificial peak which was induced in the rock sample frequency response curve of FIG. 2 by the resonance of the gas atmosphere at a corresponding frequency.

The frequency of the fluid resonance will vary with the velocity of sound in the fluid, the geometry of the confining vessel, and the mode of vibration. As a result, there generally are resonances at many different frequencies, offering the possibility of enhancing the response of a vibrating body, such as a transducer, at particular frequencies over a wide range.

A pressure vessel resonance $f_n$ due to a confined compressible fluid can be expressed as $$f_n = k A_n v \tag{1}$$

where k is a proportionality constant, $A_n$ is a geometric factor determined by the shape of the pressure vessel, and v is the velocity of sound in the fluid. A change in the velocity of sound in the fluid can be accomplished through changing the pressure or temperature of the fluid or by substituting a different fluid. The pressure vessel itself may be considered as an acoustic transmission medium between the external surrounding fluid, the internal compressible fluid, and the electromechanical transducer.

By selecting appropriate values of pressure and temperature for a particular vessel and fluid, a resonance of the confining fluid may be arranged to occur within a particular frequency range of interest and thereby discriminate against mechanical vibrations outside the range of interest, thus significantly improving the signal-to-noise ratio, sensitivity, and resolution of the transducer of the present invention as compared to previous transducer designs.

Although a typical embodiment of the present invention has been illustrated and discussed above, modifications and additional embodiments of the invention will undoubtedly be apparent to those skilled in the art. For instance, although the embodiment illustrated is adapted for detecting acoustic wave energy, this invention should be equally applicable to a device designed for generating acoustic waves. In addition, various changes may be made in the configurations, sizes, and arrangements of the components of the invention without departing from the scope of the invention. Furthermore, equivalent elements may be substituted for those illustrated and described herein, parts or connections might be reversed or otherwise interchanged, and certain features of the invention might be utilized independently of the use of other features. Consequently, the example presented herein, which is provided to teach those skilled in the art how to construct the apparatus and perform the method of this invention, should be considered as illustrative only and not inclusive, the appended claims being more indicative of the full scope of the invention.

What is claimed is:

1. An acoustic transducer, comprising:
    a pressure tight vessel;
    a compressible fluid disposed within said vessel;
    an electromechanical transducer disposed within said vessel at an antinode of a characteristic resonance pattern for said fluid within said vessel; and
    a port communicating with the interior of said vessel for changing the pressure of said fluid within said vessel.

2. The transducer of claim 1, further comprising an acoustically transparent window in said vessel for admitting acoustic wave energy therein.

3. The transducer of claim 2, wherein said fluid further comprises a gaseous fluid.

4. The transducer of claim 3, further comprising a source of said fluid and a pressure control coupled to said port and said source for controlling the pressure of said fluid within said vessel.

5. An acoustic transducer, comprising:
    a pressure tight vessel;
    an acoustically transparent window in said vessel;
    a gas disposed within said vessel;
    an electromechanical transducer disposed within said vessel at an antinode for a resonant wave of said gas within said vessel;
    a port communicating with the interior of said vessel; and
    a pressure control coupled to said port and to a source of said gas for controlling the pressure of said fluid within said vessel.

6. A method of converting acoustic wave energy to an electrical signal, comprising the steps of:
    placing an electromechanical transducer within a pressure tight vessel at an antinode of a resonant wave, and
    pressurizing the vessel to achieve a resonance at a predetermined acoustic wave frequency.

* * * * *